(12) United States Patent
Reardon (10) Patent No.: US 12,234,536 B2
(45) Date of Patent: Feb. 25, 2025

(54) HIGH SPEED STEEL COMPOSITION (71) Applicant: Arthur Craig Reardon, Webster, NY (US)

(72) Inventor: Arthur Craig Reardon, Webster, NY (US)

( * ) Notice: Subject to any disclaimer, the term of this patent is extended or adjusted under 35 U.S.C. 154(b) by 0 days.

(21) Appl. No.: 18/715,318

(22) PCT Filed: Nov. 28, 2023

(86) PCT No.: PCT/US2023/081465
§ 371 (c)(1),
(2) Date: May 31, 2024

(87) PCT Pub. No.: WO2024/118682
PCT Pub. Date: Jun. 6, 2024

(65) Prior Publication Data
US 2024/0417833 A1 Dec. 19, 2024

Related U.S. Application Data

(63) Continuation of application No. 18/074,470, filed on Dec. 3, 2022.

(51) Int. Cl.
*C22C 38/30* (2006.01)
*B33Y 70/00* (2020.01)
(Continued)

(52) U.S. Cl.
CPC .............. *C22C 38/30* (2013.01); *B33Y 70/00* (2014.12); *C22C 33/02* (2013.01); *C22C 38/001* (2013.01);
(Continued)

(58) Field of Classification Search
None
See application file for complete search history.

(56) References Cited

U.S. PATENT DOCUMENTS 3,627,514 A 12/1971 Steven
3,809,541 A 5/1974 Steven
(Continued)

FOREIGN PATENT DOCUMENTS

BR PI0614983 3/2011
CA 2371320 10/2002
(Continued)

*Primary Examiner* — Anthony M Liang
(74) *Attorney, Agent, or Firm* — Patent Technologies, LLC; Robert D. Gunderman (57) ABSTRACT

A high speed steel composition and article are disclosed consisting, in weight percent, essentially of about 0.75% to 1.69% carbon, 0.15% to 0.80% manganese, 0.20% maximum phosphorous, 0.25% maximum sulfur, 0.20% to 0.65% silicon, 3.75% to 4.50% chromium, greater than 10.00% to 20.00% tungsten, greater than 1.25% to 4.21% molybdenum, 4.00% maximum vanadium, 4.00% maximum columbium, 12.00% maximum cobalt, 0.010% to 0.090% nitrogen, 0.75% maximum copper, 0.75% maximum nickel, 0.25% maximum aluminum and balance iron with residual elements and trace impurities in normal amounts, the composition and article being characterized by very high hardness capability and wear resistance. The high speed steel article is preferably manufactured via powder metallurgy by dispersion of a liquid metal stream of the alloy with nitrogen gas to form metal powder. This metal powder may be utilized in metal additive manufacturing applications and is suitable for applications involving chip cutting machining, or advanced machine elements.

19 Claims, 3 Drawing Sheets

(51) Int. Cl.
*C22C 33/02* (2006.01)
*C22C 38/00* (2006.01)
*C22C 38/02* (2006.01)
*C22C 38/04* (2006.01)
*C22C 38/22* (2006.01)
*C22C 38/24* (2006.01)

(52) U.S. Cl.
CPC ............ *C22C 38/002* (2013.01); *C22C 38/02* (2013.01); *C22C 38/04* (2013.01); *C22C 38/22* (2013.01); *C22C 38/24* (2013.01)

(56) References Cited

U.S. PATENT DOCUMENTS

| | | | |
|---|---|---|---|
| 3,850,621 | A | 11/1974 | Haberling et al. |
| 3,859,081 | A | 1/1975 | Harvey et al. |
| 3,901,690 | A | 8/1975 | Philip et al. |
| 4,168,159 | A | 9/1979 | Schlatter et al. |
| 4,224,060 | A | 9/1980 | de Souza et al. |
| 4,276,087 | A | 6/1981 | Haswell et al. |
| 4,780,139 | A | 10/1988 | Hellman et al. |
| 4,880,461 | A | 11/1989 | Uchida |
| 6,057,045 | A | 5/2000 | Wojcieszynski et al. |
| 6,482,354 | B1 | 11/2002 | Wert et al. |
| 7,695,576 | B2 | 4/2010 | Ozaki |
| 7,708,841 | B2 | 5/2010 | Saller et al. |
| 7,785,531 | B2 | 8/2010 | Rabitsch et al. |
| 7,947,136 | B2 | 5/2011 | Saller et al. |
| 7,967,927 | B2 | 6/2011 | Kuehmann et al. |
| 8,454,765 | B2 | 6/2013 | Saller et al. |
| 9,192,981 | B2 | 11/2015 | Forbes Jones et al. |
| 10,337,093 | B2 | 7/2019 | Forbes Jones et al. |
| 10,458,007 | B2 | 10/2019 | Wert |
| 11,215,090 | B2 | 1/2022 | Qiao et al. |
| 2009/0123322 | A1 | 5/2009 | Barbosa et al. |
| 2018/0080095 | A1 | 3/2018 | Aktiebolag |
| 2022/0033924 | A1 | 2/2022 | Fluch et al. |
| 2022/0227947 | A1 | 7/2022 | Pataut et al. |

FOREIGN PATENT DOCUMENTS

| | | |
|---|---|---|
| CN | 1149298 | 8/2000 |
| CN | 101243199 | 8/2008 |
| CN | 103789650 | 5/2014 |
| CN | 103789651 | 5/2014 |
| DE | 4334062 | 4/1994 |
| EP | 1917376 | 5/2008 |
| FR | 1312205 | 12/1962 |
| GB | 1 552 274 | 9/1979 |
| GB | 2096171 | 10/1982 |
| IN | 800/CHENP/2008 | 11/2008 |
| JP | 1997078207 | 3/1997 |
| KR | 1020080038130 | 5/2008 |
| RU | 02279494 | 7/2006 |
| WO | WO 2004108970 | 12/2004 |
| WO | WO 2007011466 | 1/2007 |
| WO | WO/2007/021243 | 2/2007 |
| WO | WO 2007/021243 A1 | 2/2007 |
| WO | WO 2013156091 | 10/2013 |
| WO | WO 2014053385 | 4/2014 |
| WO | WO 2022018341 | 1/2022 |
| WO | WO 2022018342 | 1/2022 |
| WO | WO 2022038511 | 2/2022 |

HIGH SPEED STEEL COMPOSITION

CROSS REFERENCE TO RELATED PATENT APPLICATIONS

This application claims priority to U.S. patent application Ser. No. 18/074,470 filed on Dec. 3, 2022 entitled "High Speed Steel Composition" by Arthur Craig Reardon, and to International Application Number PCT/US2023/081465 filed Nov. 28, 2023, the entire disclosures of which are incorporated herein by reference.

TECHNICAL FIELD

The present invention relates primarily to tool steels and high speed steels, and more particularly to an improved high speed steel composition, preferably manufactured using powder metallurgy (PM) processing.

BACKGROUND ART

High speed steels, a special class of tool steels that were named primarily for their ability to cut and machine materials at high speeds, are complex iron based alloys that can comprise carbon, tungsten, vanadium, chromium, silicon, molybdenum, and numerous other alloying elements or combinations thereof. In certain cases these additional alloying elements may include columbium, sulfur, nitrogen, or cobalt. The carbon and alloying elements are balanced at sufficient levels to provide high attainable hardening responses during heat treatment, high resistance to the softening effects of elevated temperature, excellent wear resistance, and good toughness for effective use in industrial cutting applications.

In accordance with the AISI classification system, each group of high speed steels possessing similar chemical compositions and properties is identified by a capital letter followed by a numerical designation. For example, the AISI classification system designates that in the T series grades tungsten is used as the primary alloying element; M series high speed steels contain molybdenum as the primary alloying element. Within each group, individual high speed steel types are assigned specific code numbers (e.g., T1, T2, T15, M1, M2, M42), but this number has no significance other than to distinguish one grade of steel from another within the same group. T1 is not interpreted to be more highly alloyed than T2, or more wear resistant, or more hardenable, etc. based upon its number designation.

The M-series alloys contain approximately 3.25% to 11.00% molybdenum, with vanadium, tungsten, chromium, and cobalt as the other main alloying elements. The T-series alloys contain 11.75% to 21% tungsten with vanadium, chromium, and cobalt as the other major alloying elements. All types, whether tungsten or molybdenum, contain about 4% Cr while the vanadium and carbon contents among different grades can vary significantly. As a general rule the carbon content must be increased as the vanadium content increases in order to allow for the formation of vanadium carbides. The cobalt containing tungsten grades possess from 4.25% to 13% Co and range from T4 through T15. T1 does not contain either molybdenum or cobalt.

The M-type steels are somewhat tougher than the T-type steels in general, but their red hardness is often slightly lower. Through the addition of tungsten (and, to a lesser extent, vanadium) to the plain molybdenum grades, compensation for this reduced red hardness is partially accomplished. The tungsten-molybdenum grades, such as M2, M3, and M4 are relatively popular in commercial applications for this reason: they possess good red hardness characteristics, which is one of the desirable properties of these steels, without excessive cost.

The M-type steels are less prone to distortion during heat treatment than the T-type steels, are generally higher in abrasion resistance, and may, in certain cases, be less expensive. But due to their higher molybdenum content they are much more susceptible to demolybdenization (molybdenum oxide volatizing from the steel) during heat treatment.

The amount, size, type, shape, and distribution of the alloy carbides that are present in the microstructure have a very strong impact on the wear resistance of high speed steels. The function that these carbides serve can be understood through the use of an analogy. Consider the appearance and function of a cobblestone road: the alloy carbides that appear in the tool steel microstructure serve a purpose that is analogous to the function of the wear resistant cobblestones in the road-they provide a very hard contact surface area that is extremely resistant to abrasion and wear. And the mortar that holds the cobblestones together is analogous to the steel matrix that holds the carbides together in the alloy.

Depending upon the chemical composition of the alloy, many different types of carbides can be formed. Different carbide forms are typically identified in a fundamental manner by their chemical compositions. For example, in the microstructure of columbium carbide, there is a one-to-one ratio of columbium atoms to carbon atoms, to form the carbide phase CbC. This one-to one ratio is usually expressed in a generalized way by the expression MC, where C represents carbon and M represents the alloying element of interest (in this example, Cb or columbium). A rather large variety of other combinations are also possible. Cementite is an $M_3C$ type carbide that consists of one atom of carbon and three atoms of iron to form $Fe_3C$. This type of carbide is normally found in plain carbon and low-alloy carbon steels. In steels that contain significant amounts of manganese, the precipitation of an $M_3C$ type of carbide, namely $Mn_3C$, is also common. Since iron and manganese have very similar atomic weights, both of these carbides are typically found in combination. But by using this type of terminology far more complex carbides can also be represented. The $M_3C$ carbide is consistent with the chemical formula of $(Fe+X)_3C$, where X refers to different combinations of manganese as well as the four major alloying elements, V, W, Cr, and Mo.

The wear resistance of high speed steels generally increases with increasing carbide hardness and volume percent. The precipitated MC metal carbides in particular can attain very high hardness values approaching 2900 HV, and thus contribute significantly to the wear resistance of high speed steels that are alloyed to contain large volume fractions of these carbides. Depending upon the alloy composition, high speed steels typically contain more than one type of carbide. For example, in annealed M2 high speed steel the carbides are a mixture of MC, $M_2C$, $M_6C$, $M_7C_3$ and $M_{23}C_6$. In practically any given high speed steel, the wear resistance depends upon the hardness of the steel. However achieved, higher hardness is typically an aim when highly abrasive cutting conditions will be encountered. To improve wear resistance, carbon content can be increased simultaneously with vanadium content to form a greater volume percent of extremely hard vanadium carbides. M3 (class 2), M4, M48 and T15 all belong in this category, and they all exhibit extremely high wear resistance. Further improvement in wear resistance may be achieved through the use of columbium in combination with vanadium to form the extremely hard MC type carbides.

High speed steel types M1 through M7 (with the exception of M6) are not alloyed with cobalt, but all contain some amount of tungsten. M10 contains neither tungsten nor cobalt. The premium grades containing molybdenum, cobalt, and tungsten are generally classified in the M30 and M40 series. The super high-speed steels typically range from M40 on up, and are capable of being heat treated to very high hardness levels. In certain cases, 70 Rockwell C can be achieved by some of these grades. Cobalt is utilized in these super high speed steel alloy compositions to increase the attainable hardness capability by increasing the activity of carbon during heat treatment. Table I lists the UNS and corresponding AISI designations together with the chemical composition limits for these internationally recognized high speed steel alloys.

High speed steels were first invented in the early 20th century and subsequently developed through the following decades. While the beneficial effects of tungsten, molybdenum, and vanadium alloying elements were recognized by scientists in the metallurgical literature and by engineers who specified the use of these materials in industrial applications, the addition of molybdenum in particular was initially restricted to relatively small amounts. This was due to the deleterious effects of molybdenum oxide volatizing from the steel during heating in a furnace atmosphere that contained significant amounts of oxygen, known as demolybdenization. This left the steel with an inability to achieve the required hardening response during heat treatment and became a significant issue for high speed steel alloys that contained approximately 3.00% molybdenum or more. Tungsten alloy additions did not result in this deleterious side effect, and for this reason the tungsten based grades of high speed steels (T1, T2, etc.) were initially favored. It is noted that in any of the T grades listed in Table 1 the maximum molybdenum content does not exceed 1.25%. After the discovery that demolybdenization could be minimized through the implementation of proper controls on the oxygen levels in the furnace atmospheres, higher levels of molybdenum alloy additions were investigated. Due in part to a tungsten shortage in the United States during World War II, development of the M type high speed steels accelerated, and eventually many of these M grades gained favor over several of the T grades. While it is generally acknowledged that the most favorable combination of properties can be achieved in high speed steels that contain both tungsten and molybdenum, there is no conclusive agreement among metallurgists regarding what ratio of these two alloying elements should be selected to achieve the best overall results. With some notable exceptions over the past century, the molybdenum content range of 1.00% to 4.25% for these particular steel alloys has remained sparsely investigated. Based upon the teachings of the current invention, high speed steels containing molybdenum within a subset of this general range in combination with higher levels of tungsten alloy additions are capable of enhancing the properties of these alloys in novel and non-obvious ways.

DISCLOSURE OF THE INVENTION

In accordance with the present invention, there is provided an improved high speed steel composition, article of manufacture, and process of manufacture. The composition and article of manufacture have very high hardness capability and wear resistance, and is preferably manufactured in a powder metallurgical manner by dispersion of a liquid metal stream of the alloy with nitrogen gas to form metal powder. This metal powder may be utilized in metal additive manufacturing applications and is suitable for applications involving chip cutting machining, or advanced machine elements. The improved high speed steel composition consists, in weight percent, essentially of about 0.75% to 1.69% carbon, 0.15% to 0.80% manganese, 0.20% maximum phosphorous, 0.25% maximum sulfur, 0.20% to 0.65% silicon, 3.75% to 4.50% chromium, greater than 10.00% to 20.00% tungsten, greater than 1.25% to 4.21% molybdenum, 4.00% maximum vanadium, 4.00% maximum columbium, 12.00% maximum cobalt, 0.010% to 0.090% nitrogen, 0.75% maximum copper, 0.75% maximum nickel, 0.25% maximum aluminum and balance iron with residual elements and trace impurities in normal amounts.

This summary outlines rather generally the features and technical advantages of one or more embodiments of this disclosure in order that the following detailed description may be better understood. Additional features and advantages of this disclosure may also be determined after reading this specification and claims with the accompanying drawings.

The foregoing paragraph has been provided by way of introduction, and is not intended to limit the scope of the invention as defined by this specification, claims and the attached drawings.

BRIEF DESCRIPTION OF THE DRAWINGS

The invention will be described by reference to the following drawings, in which like numerals refer to like elements, and in which.

The present invention will be described in connection with a preferred embodiment; however, it will be understood that there is no intent to limit the invention to the embodiment described. On the contrary, the intent is to cover all alternatives, modifications, and equivalents as may be included within the spirit and scope of the invention as defined by this specification, claims and the attached drawings.

BEST MODE FOR CARRYING OUT THE INVENTION

For a general understanding of the present invention, reference is made to the drawings. In the drawings, like reference numerals have been used throughout to designate identical elements.

Disclosed is a novel high speed steel composition for numerous applications including, but not limited to, additive manufacturing.

The improved high speed steel composition consists essentially of, in weight percent, 0.75% to 1.69% carbon, 0.15% to 0.80% manganese, 0.00% to 0.20% phosphorous, 0.00% to 0.25% sulfur, 0.20% to 0.65% silicon, 3.75% to 4.50% chromium, 0.00% to 4.00% vanadium, greater than 10.00% to 20.00% tungsten, greater than 1.25% to 4.21% molybdenum, 0.00% to 12.00% cobalt, 0.010% to 0.090% nitrogen, 0.00% to 4.00% columbium, 0.00% to 0.75% copper, 0.00% to 0.75% nickel, 0.00% to 0.25% aluminum; wherein the combination of nickel plus copper in weight percent is greater than or equal to 0.00% and less than or equal to 1.00%; and wherein the combination of vanadium plus columbium in weight percent is greater than or equal to 0.00% and less than or equal to 4.00%; with the remainder essentially iron and residual elements in normal amounts.

In another embodiment of the present invention, the improved high speed steel composition consists essentially of, in weight percent, 1.20% to 1.65% carbon, 0.15% to 0.80% manganese, 0.00% to 0.20% phosphorous, 0.00% to 0.25% sulfur, 0.20% to 0.65% silicon, 3.75% to 4.50% chromium, 1.75% to 2.75% vanadium, greater than 10.00% to 18.00% tungsten, 2.50% to 3.50% molybdenum, 0.00% to 12.00% cobalt, 0.010% to 0.090% nitrogen, 0.64% to 1.15% columbium, 0.00% to 0.75% copper, 0.00% to 0.75% nickel, 0.00% to 0.25% aluminum; wherein the combination of nickel plus copper in weight percent is greater than or equal to 0.00% and less than or equal to 1.00%; wherein the combination of tungsten plus 1.9 times the amount of molybdenum in weight percent is greater than or equal to 14.75% and less than 24.75%; and wherein the combination of vanadium plus columbium in weight percent is greater than or equal to 2.39% and less than or equal to 3.90%; with the remainder essentially iron and residual elements in normal amounts.

In another embodiment of the present invention, the improved high speed steel composition consists essentially of, in weight percent, 1.30% to 1.55% carbon, 0.15% to 0.40% manganese, 0.00% to 0.03% phosphorous, 0.03% to 0.07% sulfur, 0.20% to 0.65% silicon, 3.75% to 4.50% chromium, 1.75% to 2.75% vanadium, greater than 10.00% to 11.50% tungsten, 2.50% to 3.50% molybdenum, 5.50% to 6.50% cobalt, 0.010% to 0.090% nitrogen, 0.64% to 1.15% columbium, 0.00% to 0.75% copper, 0.00% to 0.75% nickel, 0.00% to 0.25% aluminum; wherein the combination of nickel plus copper in weight percent is greater than or equal to 0.00% and less than or equal to 0.75%; wherein the combination of tungsten plus 1.9 times the amount of molybdenum in weight percent is greater than or equal to 14.75% and less than or equal to 18.15%; and wherein the combination of vanadium plus columbium in weight percent is greater than or equal to 2.39% and less than or equal to 3.90%; with the remainder essentially iron and residual elements in normal amounts.

In some embodiments of the present invention, the range of tungsten (W) is between 7.25% and 20.00% with all other ranges remaining essentially the same.

In some embodiments of the present invention, sulfur is replaced in all or in part with one or more elements selected from the group consisting of selenium, lead, and tellurium with all other elements and ranges remaining essentially the same for each of the embodiments described herein.

Figure 1:
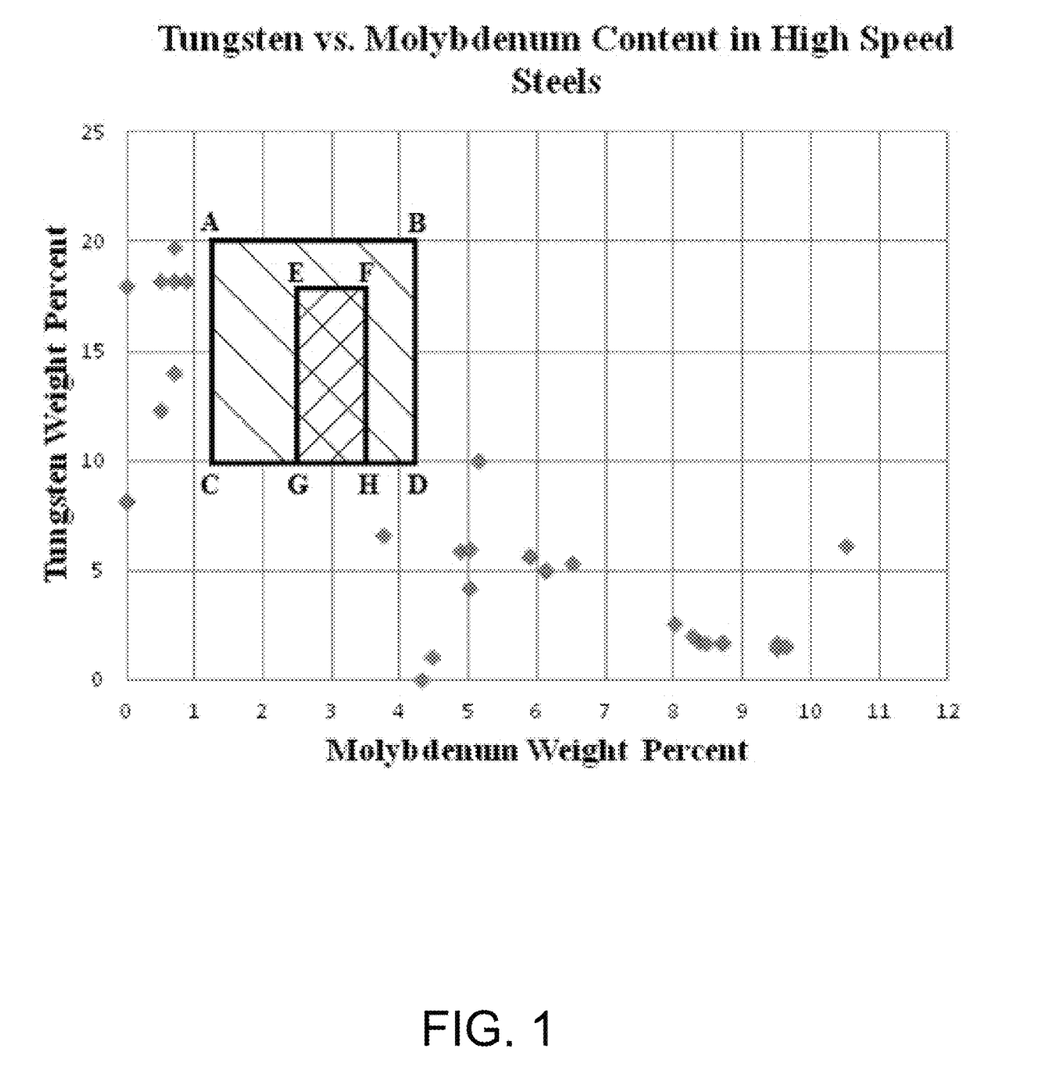
FIG. 1 is a graphical representation of the tungsten versus molybdenum content of various high speed steel alloys compared with the present invention.

The tungsten content versus the molybdenum content for each alloy that appears in Table I below can be viewed in a more compact manner via the graphical representation shown in FIG. 1. The area outlined by the vertices identified by A (1.25, 20), B (4.21, 20), C (1.25, 10), and D (4.21, 10) in FIG. 1 encapsulate a region of the graph occupied by the article of the present invention as stipulated in claim 1; the preferred area contained in the graph is outlined by the rectangle with vertices located at E (2.50, 18), F (3.5, 18), G (2.50, 10), and H (3.5, 10) as stipulated in claim 2. None of the high speed steel alloys in Table I occupy or overlap either of these two regions. Note that average values for the tungsten and molybdenum contents of each alloy listed in Table 1 are presented in the graph of FIG. 1.

TABLE 1

Composition limits of the principal grades of high speed steels. Note that for all grades listed, (Ni + Cu) ≤0.75%. (ASTM A600-92a (2004))

| Designation | | Composition, % | | | | | | | | |
|---|---|---|---|---|---|---|---|---|---|---|
| AISI | UNS | C | Mn | Si | Cr | Ni | Mo | W | V | Co |
| Molybdenum high-speed steels | | | | | | | | | | |
| M1 | T11301 | 0.78-0.88 | 0.15-0.40 | 0.20-0.50 | 3.50-4.00 | 0.30 max | 8.20-9.20 | 1.40-2.10 | 1.00-1.25 | — |
| M2 | T11302 | 0.78-0.88; 0.95-1.05 | 0.15-0.40 | 0.20-0.45 | 3.75-4.50 | 0.30 max | 4.50-5.50 | 5.50-6.75 | 1.75-2.20 | — |
| M3, class 1 | T11313 | 1.00-1.10 | 0.15-0.40 | 0.20-0.45 | 3.75-4.50 | 0.30 max | 4.75-6.50 | 5.00-6.75 | 2.25-2.75 | — |
| M3, class 2 | T11323 | 1.15-1.25 | 0.15-0.40 | 0.20-0.45 | 3.75-4.50 | 0.30 max | 4.75-6.50 | 5.00-6.75 | 2.75-3.75 | — |
| M4 | T11304 | 1.25-1.40 | 0.15-0.40 | 0.20-0.45 | 3.75-4.75 | 0.30 max | 4.25-5.50 | 5.25-6.50 | 3.75-4.50 | — |
| M7 | T11307 | 0.97-1.05 | 0.15-0.40 | 0.20-0.55 | 3.50-4.00 | 0.30 max | 8.20-9.20 | 1.40-2.10 | 1.75-2.25 | — |
| M10 | T11310 | 0.84-0.94; 0.95-1.05 | 0.10-0.40 | 0.20-0.45 | 3.75-4.50 | 0.30 max | 7.75-8.50 | — | 1.80-2.20 | — |
| M30 | T11330 | 0.75-0.85 | 0.15-0.40 | 0.20-0.45 | 3.50-4.25 | 0.30 max | 7.75-9.00 | 1.30-2.30 | 1.00-1.40 | 4.50-5.50 |
| M33 | T11333 | 0.85-0.92 | 0.15-0.40 | 0.15-0.50 | 3.50-4.00 | 0.30 max | 9.00-10.00 | 1.30-2.10 | 1.00-1.35 | 7.75-8.75 |
| M34 | T11334 | 0.85-0.92 | 0.15-0.40 | 0.20-0.45 | 3.50-4.00 | 0.30 max | 7.75-9.20 | 1.40-2.10 | 1.90-2.30 | 7.75-8.75 |
| M35 | T11335 | 0.82-0.88 | 0.15-0.40 | 0.20-0.45 | 3.75-4.50 | 0.30 max | 4.50-5.50 | 5.50-6.75 | 1.75-2.20 | 4.50-5.50 |
| M36 | T11336 | 0.80-0.90 | 0.15-0.40 | 0.20-0.45 | 3.75-4.50 | 0.30 max | 4.50-5.50 | 5.50-6.50 | 1.75-2.25 | 7.75-8.75 |
| M41 | T11341 | 1.05-1.15 | 0.20-0.60 | 0.15-0.50 | 3.75-4.50 | 0.30 max | 3.25-4.25 | 6.25-7.00 | 1.75-2.25 | 4.75-5.75 |
| M42 | T11342 | 1.05-1.15 | 0.15-0.40 | 0.15-0.65 | 3.50-4.25 | 0.30 max | 9.00-10.00 | 1.15-1.85 | 0.95-1.35 | 7.75-8.75 |
| M43 | T11343 | 1.15-1.25 | 0.20-0.40 | 0.15-0.65 | 3.50-4.25 | 0.30 max | 7.50-8.50 | 2.25-3.00 | 1.50-1.75 | 7.75-8.75 |
| M44 | T11344 | 1.10-1.20 | 0.20-0.40 | 0.30-0.55 | 4.00-4.75 | 0.30 max | 6.00-7.00 | 5.00-5.75 | 1.85-2.20 | 11.00-12.25 |
| M46 | T11346 | 1.22-1.30 | 0.20-0.40 | 0.40-0.65 | 3.70-4.20 | 0.30 max | 8.00-8.50 | 1.90-2.20 | 3.00-3.30 | 7.80-8.80 |
| M47 | T11347 | 1.05-1.15 | 0.15-0.40 | 0.20-0.45 | 3.50-4.00 | 0.30 max | 9.25-10.00 | 1.30-1.80 | 1.15-1.35 | 4.75-5.25 |
| M48 | T11348 | 1.42-4.52 | 0.15-0.40 | 0.15-0.40 | 3.50-4.00 | 0.30 max | 4.75-5.50 | 9.50-10.50 | 2.75-3.25 | 8.00-10.00 |
| M62 | T11362 | 1.25-1.35 | 0.15-0.40 | 0.15-0.40 | 3.50-4.00 | 0.30 max | 10.00-11.00 | 5.75-6.50 | 1.80-2.10 | — |
| Tungsten high-speed steels | | | | | | | | | | |
| T1 | T12001 | 0.65-0.80 | 0.10-0.40 | 0.20-0.40 | 3.75-4.50 | 0.30 max | — | 17.25-18.75 | 0.90-1.30 | — |
| T2 | T12002 | 0.80-0.90 | 0.20-0.40 | 0.20-0.40 | 3.75-4.50 | 0.30 max | 1.00 max | 17.50-19.00 | 1.80-2.40 | — |
| T4 | T12004 | 0.70-0.80 | 0.10-0.40 | 0.20-0.40 | 3.75-4.50 | 0.30 max | 0.40-1.00 | 17.50-19.00 | 0.80-1.20 | 4.25-5.75 |
| T5 | T12005 | 0.75-0.85 | 0.20-0.40 | 0.20-0.40 | 3.75-5.00 | 0.30 max | 0.50-1.25 | 17.50-19.00 | 1.80-2.40 | 7.00-9.50 |

TABLE 1-continued

Composition limits of the principal grades of high speed steels. Note that
for all grades listed, (Ni + Cu) ≤0.75%. (ASTM A600-92a (2004))

| Designation | | Composition, % | | | | | | | | |
|---|---|---|---|---|---|---|---|---|---|---|
| AISI | UNS | C | Mn | Si | Cr | Ni | Mo | W | V | Co |
| T6 | T12006 | 0.75-0.85 | 0.20-0.40 | 0.20-0.40 | 4.00-4.75 | 0.30 max | 0.40-1.00 | 18.50-21.00 | 1.50-2.10 | 11.00-13.00 |
| T8 | T12008 | 0.75-0.85 | 0.20-0.40 | 0.20-0.40 | 3.75-4.50 | 0.30 max | 0.40-1.00 | 13.25-14.75 | 1.80-2.40 | 4.25-5.75 |
| T15 | T12015 | 1.50-1.60 | 0.15-0.40 | 0.15-0.40 | 3.75-5.00 | 0.30 max | 1.00 max | 11.75-13.00 | 4.50-5.25 | 4.75-5.25 |
| Intermediate high-speed steels | | | | | | | | | | |
| M50 | T11350 | 0.78-0.88 | 0.15-0.45 | 0.20-0.60 | 3.75-4.50 | 0.30 max | 3.90-4.75 | — | 0.80-1.25 | — |
| M52 | T11352 | 0.85-0.95 | 0.15-0.45 | 0.20-0.60 | 3.50-4.30 | 0.30 max | 4.00-4.90 | 0.75-1.50 | 1.65-2.25 | — |

Figure 2:
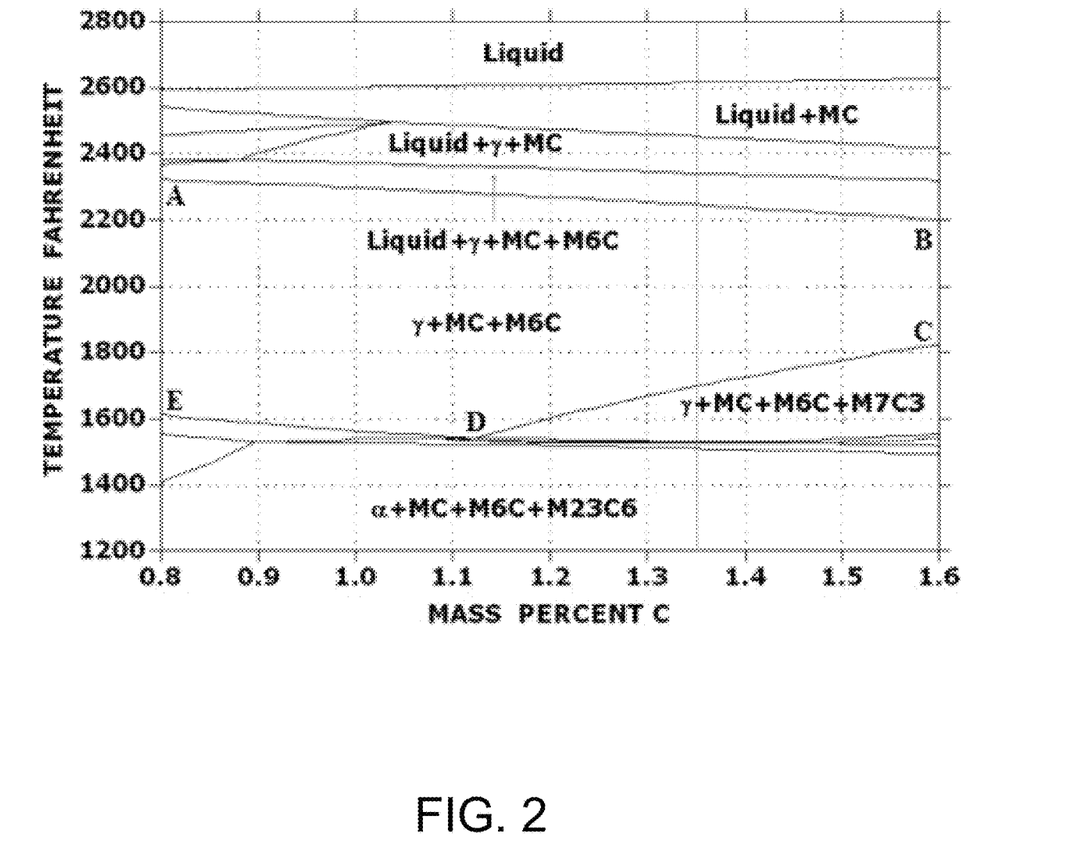
FIG. 2 is a graphical representation of a portion of the equilibrium phase diagram for the article of the current invention.

There are other distinctions that exist between the article of the current invention and the high speed steel alloys presented in Table I. M42 is a very high hardness capability cobalt bearing super high speed steel. Per ASTM A600-92a (2004) M42 is required to achieve a minimum hardness of 66 HRC when austenitized at a temperature of 2150 degrees Fahrenheit in a salt bath (or 2170 degrees Fahrenheit in a controlled atmosphere furnace) followed by a triple temper at 1000 degrees Fahrenheit for 2+2+2 hours. M42 is one of the highest hardness capability super high speed steel alloys that currently exists, and none of the other alloys that appear in Table 3 of ASTM A600-92a (2004) have a higher minimum hardness value called out. Thermodynamic calculations were performed as a part of the development work for the article of the current invention using the CALPHAD method; this method is based on the principle that a phase diagram is a representation of the thermodynamic properties of a system. If the thermodynamic properties are known, it is possible to calculate the multi-component phase diagrams for that system. Thermodynamic descriptions such as the Gibbs energy of each phase of lower order systems (unary, binary, etc) are combined to extrapolate higher order systems (such as ternary, quaternary, etc). FIG. 2 illustrates a portion of the equilibrium phase diagram for the present invention. The mass percent of carbon appears on the horizontal axis, and the temperature in degrees Fahrenheit appears on the vertical axis. Consistent with the composition of Alloy I shown in Table II, FIG. 2 includes a vertical line located at 1.35% carbon on the horizontal axis. The area outlined by the vertices ABCDE represents the region of austenite stability in this phase system that is critical for the determination of, among other parameters, heat treating temperature limits.

One of the purposes phase diagrams help serve is to ensure that during heat treatment at the austenitization temperature the microstructure primarily consists of austenite and carbides, with no unwanted phases such as ferrite being present. Inspection of the phase diagram in FIG. 2 illustrates that this is certainly the case for the present invention; the alloy system is quite robust with no danger of ferrite formation. The area outlined by the vertices ABCDE in FIG. 2 represents the region of austenite stability in this alloy system where a vertical section taken through this area for a specific carbon content is critical in the determination of, among other parameters, heat treating temperature limitations. This region for the article of the current invention is substantially larger in overall dimension than the austenitic region outlined by the vertices ABCDE that appear in the corresponding portion of the equilibrium phase diagram for M42 shown in FIG. 3. This is a very important, non-obvious and unexpected result.

Figure 3:
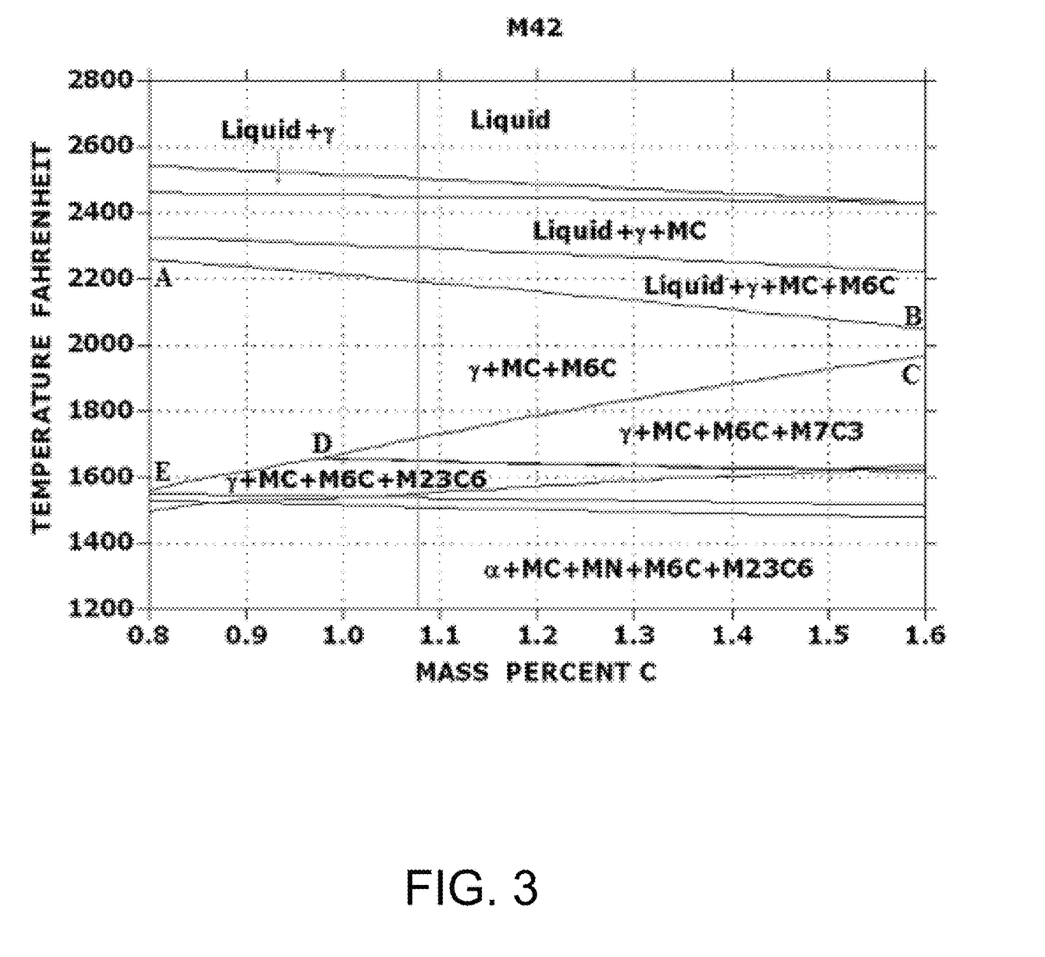
FIG. 3 is a graphical representation of a portion of the equilibrium phase diagram for M42 high speed steel.

FIG. 3 is a graphical representation of a portion of the equilibrium phase diagram for M42 high speed steel. The mass percent of carbon appears on the horizontal axis. The temperature in degrees Fahrenheit appears on the vertical axis. The area outlined by the vertices ABCDE represents the region of austenite stability in this phase system that is critical for the determination of, among other parameters, heat treating temperature limits.

The liquidus temperature that can be determined from the phase diagram is critical in the melting and atomization stages of the powder metallurgy (PM) manufacturing process, while the solidus temperature is critical for the austenitization stage of heat treating. Utilizing the information from the phase diagrams shown in FIGS. 2 and 3, the solidus temperature of the new high speed steel article of the present invention was determined to be higher than that of M42. Table II below provides chemical compositions and Table III below lists the corresponding equilibrium values for both the liquidus and solidus temperatures for several of the new high-speed steel compositions of the present invention and that of M42. The higher the solidus temperature, the higher the austenitization temperature that can generally be used during the martensitic hardening process in heat treating. Thus, the new high-speed steel article of the present invention may be austenitized at temperatures higher than those used for M42. Due to its lower solidus temperature and the resulting possibility of initiating incipient melting along the grain boundaries, M42 is limited to a maximum austenitizing temperature of approximately 2175° F. while the article of the present invention may be austenitized at temperatures exceeding 2200° F.

TABLE II

Chemical compositions of the current invention and the super high speed steel M42.

| HSS Alloy | C | N | Si | Mn | S | Cr | V | Mo | W | Co |
|---|---|---|---|---|---|---|---|---|---|---|
| Alloy I | 1.35 | 0.04 | 0.42 | 0.28 | — | 4.12 | 3.00 | 3.0 | 10.5 | 6.0 |
| Alloy II | 1.35 | 0.04 | 0.42 | 0.28 | — | 4.12 | 2.50 | 3.0 | 10.5 | 6.0 |
| Alloy III | 1.45 | 0.04 | 0.42 | 0.28 | — | 4.12 | 3.00 | 3.0 | 10.5 | 6.0 |
| Alloy IV | 1.35 | 0.04 | 0.42 | 0.70 | 0.22 | 4.12 | 3.00 | 3.0 | 10.5 | 6.0 |
| M42 | 1.08 | 0.04 | 0.30 | 0.30 | — | 3.75 | 1.15 | 9.5 | 1.60 | 8.0 |

TABLE III

Associated liquidus and solidus temperatures for the chemical compositions shown in Table II for articles of the current invention and for the super high speed steel M42.

| Alloy | Liquidus (Fahrenheit) | Solidus (Fahrenheit) |
|---|---|---|
| Alloy I | 2615 | 2245 |
| Alloy II | 2577 | 2223 |
| Alloy III | 2619 | 2227 |
| Alloy IV | 2661 | 2235 |
| M42 | 2503 | 2191 |

Table IV and Table V below list, respectively, the calculated equilibrium values for the steel matrix composition and the molar percent of phases at 2175° F. for the articles of the new high-speed steel of the present invention and M42. Carbon exerts the greatest influence on the matrix hardness and typically the higher the matrix carbon content, the higher the matrix hardness that can be achieved during heat treatment. In addition, the matrix carbon is a key element involved in the secondary-hardening response of the alloy during tempering. The matrix carbon content of M42 at 2175° F. is 0.753 wt. %. The matrix carbon contents for the alloys of the present invention are similar, with Alloy II and Alloy III possessing values of matrix carbon of 0.779 wt. % and 0.759 wt. %, respectively. Other elements dissolved in the matrix that are also involved in the secondary-hardening response include chromium, molybdenum, tungsten, vanadium (by precipitating secondary carbides), and cobalt (by increasing the activity of carbon). The matrix amount of these alloying elements—as well as that of carbon—is a good indicator of the secondary-hardening response that these high-speed steel alloys will achieve upon tempering.

TABLE IV

Calculated equilibrium values for the steel matrix chemistry at 2175° F. for the chemical compositions shown in Table II for articles of the current invention and for M42.

| Alloy | Matrix Chemical Composition [wt. %] | | | | | | | | |
|---|---|---|---|---|---|---|---|---|---|
| | C | S | Mn | S | Cr | V | Mo | W | Co |
| Alloy I | 0.679 | 0.50 | 0.33 | — | 4.11 | 0.60 | 1.49 | 4.25 | 7.10 |
| Alloy II | 0.779 | 0.50 | 0.33 | — | 4.11 | 0.53 | 1.49 | 4.22 | 7.06 |
| Alloy III | 0.759 | 0.50 | 0.33 | — | 4.08 | 0.54 | 1.46 | 4.25 | 7.11 |
| Alloy IV | 0.686 | 0.50 | 0.39 | 0.0002 | 4.13 | 0.58 | 1.49 | 4.26 | 7.16 |
| M42 | 0.753 | 0.34 | 0.34 | — | 3.80 | 0.42 | 5.13 | 0.69 | 9.01 |

TABLE V

Calculated equilibrium values for molar % of phases at 2175° F. for the chemical compositions shown in Table II for articles of the current invention and for M42.

| Alloy | Phase [molar %] | | |
|---|---|---|---|
| | MC | $M_6C$ | MnS |
| Alloy I | 6.12 | 7.77 | — |
| Alloy II | 5.12 | 7.90 | — |
| Alloy III | 6.48 | 7.59 | — |
| Alloy IV | 6.16 | 7.81 | 0.79 |
| M42 | 1.85 | 8.55 | — |

The amount and type of primary carbides contribute to both the wear resistance and hardness of the high speed steel. Vanadium-rich MC primary carbides and tungsten-iron-molybdenum rich $M_6C$ primary carbides have hardness values of approximately 2800-2900 HV and 1500-1600 HV, respectively. As shown in Table V, at 2175° F. the new high-speed steels possess significantly greater molar percents of these vanadium rich MC primary carbides than M42. And the molar percents of the $M_6C$ primary carbides in the new high-speed steels are comparable to those of M42. The difference in the MC primary carbides is expected to contribute significantly to the overall hardness of the new high-speed steel alloy of the present invention during heat treatment, and coupled together with the results for the steel matrix compositions indicate that these new alloys possess the capability of achieving hardness values that exceed those of M42.

The main purpose of the sulfur addition to the alloy composition of this invention is to enhance the machinability of the resulting material. Other alloy additions including selenium, lead, and tellurium may also be used in place of or in combination with sulfur to further enhance the machinability of the resulting material.

The remainder of the composition of the present invention is essentially iron and residual elements in normal amounts. Residual elements encountered in the production of tool steel and high speed steel alloys during normal melting and production processes may include Sn (tin), Pb (lead), Ti (titanium), Zr (zirconium), As (arsenic), Sb (antimony), Ca (calcium), Ar (argon), O (oxygen), and H (hydrogen), among others. Ha (hafnium) may in certain cases also be encountered. Typical or normal amounts of these residual elements can vary considerably depending upon the specific melting practices that are utilized and upon the amount of scrap materials that are incorporated into the melt and the chemical composition of those scrap materials. Companies that melt and produce various grades of high speed steel alloys typically limit the combination of residual elements that are allowed in the finished material to a small fraction of 1%.

This new high speed steel invention as defined herein may be manufactured by utilizing traditional air-melt steel production methods, which can optionally be followed by electro-slag remelting (ESR). It may also be manufactured by utilizing traditional vacuum induction melting (VIM) techniques, which can optionally be followed by vacuum arc re-melting (VAR). The preferred method of manufacture is by utilizing powder metallurgy (PM) production techniques. Detailed descriptions of all of these production methods are presented in Metallurgy for the Non-Metallurgist, 2nd edition, published by ASM International and edited by the inventor Arthur C. Reardon. The resulting metal powder (after sufficient processing has been executed to isolate particles within the desired size range) may be utilized in metal additive manufacturing applications. Examples of metal additive manufacturing that can be applied to, or incorporated with, the improved high speed steel composition of the present invention, include, but are not limited to, U.S. Patent Application 2017/0056966 A1 to Myerberg et al. and entitled "Three-Dimensional Electrohydrodynamic Printing of Metallic Objects", U.S. Patent Application 2017/0189960 A1 to Hiroyuki IBE and entitled "Powder Material For Powder Additive Manufacturing and Powder Additive Manufacturing Method Using Same", U.S. Pat. No. 10,589,352 B2 to Gregory Thomas Mark and entitled "Molten Metal Jetting for Additive Manufacturing", and U.S. Pat. No. 11,141,809 B2 to Nelson et al. and entitled "Electron Beam Additive Manufacturing", the entire disclosures of each being incorporated herein by reference in their entirety as permissible by national or regional laws. For use in traditional manufacturing applications the metal powder may be compacted at elevated temperatures with suitable pressures applied from all sides, optionally followed subsequently by hot working through forging, and optionally followed subsequently by hot rolling. The resulting new high speed steel article is suitable for applications involving chip cutting machining, or advanced machine elements and may be utilized in the production of knives, gear cutting hobs, forming tools, drill bits, spade drills, end mills, milling cutters, machining inserts, shaving cutters, broaches, reamers, taps, thread rolling dies, tool bits, punches, die tooling, die inserts, countersinks, counterbores, guide rolls, and shaper cutters, among others. In particular, wire may be produced from this new high speed steel article in various sizes and geometries and joined onto a spring steel backing (such as, for example, SAE 6150 or D6a) through electron beam welding or laser welding to form a bi-metal product that is utilized to manufacture knives, reciprocating saw blades, band saw blades, hole saws, and the like.

The present invention includes an article of manufacture that comprises the novel high speed steel composition of the present invention, and the various embodiments described and envisioned herein. The article of manufacture may, in some embodiments, be suitable for production by additive manufacturing techniques, processes, and the like. In some embodiments of the present invention, the article of manufacture is a bi-metal blade.

In some embodiments of the present invention, the improved high speed steel composition of the present invention and the various embodiments described and envisioned herein are produced by powder metallurgy.

The present invention includes a process for additive manufacturing where the process comprises the step of layering or otherwise depositing or placing a powder of the improved high speed steel of the present invention.

It is, therefore, apparent that there has been provided, in accordance with the various objects of the present invention, an improved high speed steel composition, article of manufacture, and process for additive manufacturing.

While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, claims and drawings appended herein.

What is claimed is:

1. A high speed steel composition consisting essentially of, in weight percent, 0.75% to 1.69% carbon, 0.15% to 0.80% manganese, 0.00% to 0.20% phosphorous, 0.00% to 0.25% sulfur, 0.20% to 0.65% silicon, 3.75% to 4.50% chromium, 0.00% to 4.00% vanadium, greater than 10.00% to 20.00% tungsten, greater than 1.25% to 4.21% molybdenum, 0.00% to 12.00% cobalt, 0.010% to 0.090% nitrogen, 0.00% to 4.00% niobium (columbium), 0.00% to 0.75% copper, 0.00% to 0.75% nickel, 0.00% to 0.25% aluminum; wherein the combination of nickel plus copper in weight percent is greater than or equal to 0.00% and less than or equal to 1.00%; and wherein the combination of vanadium plus niobium (columbium) in weight percent is greater than or equal to 0.00% and less than or equal to 4.00%; with the remainder essentially iron and residual elements.

2. A high speed steel composition consisting essentially of, in weight percent, 1.20% to 1.65% carbon, 0.15% to 0.80% manganese, 0.00% to 0.20% phosphorous, 0.00% to 0.25% sulfur, 0.20% to 0.65% silicon, 3.75% to 4.50% chromium, 1.75% to 2.75% vanadium, greater than 10.00% to 18.00% tungsten, 2.50% to 3.50% molybdenum, 0.00% to 12.00% cobalt, 0.010% to 0.090% nitrogen, 0.64% to 1.15% niobium (columbium), 0.00% to 0.75% copper, 0.00% to 0.75% nickel, 0.00% to 0.25% aluminum; wherein the combination of nickel plus copper in weight percent is greater than or equal to 0.00% and less than or equal to 1.00%; wherein the combination of tungsten plus 1.9 times the amount of molybdenum in weight percent is greater than or equal to 14.75% and less than 24.75%; and wherein the combination of vanadium plus niobium (columbium), in weight percent is greater than or equal to 2.39% and less than or equal to 3.90%; with the remainder essentially iron and residual elements.

3. A high speed steel composition consisting essentially of, in weight percent, 1.30% to 1.55% carbon, 0.15% to 0.40% manganese, 0.00% to 0.03% phosphorous, 0.03% to 0.07% sulfur, 0.20% to 0.65% silicon, 3.75% to 4.50% chromium, 1.75% to 2.75% vanadium, greater than 10.00% to 11.50% tungsten, 2.50% to 3.50% molybdenum, 5.50% to 6.50% cobalt, 0.010% to 0.090% nitrogen, 0.64% to 1.15% niobium (columbium), 0.00% to 0.75% copper, 0.00% to 0.75% nickel, 0.00% to 0.25% aluminum; wherein the combination of nickel plus copper in weight percent is greater than or equal to 0.00% and less than or equal to 0.75%; wherein the combination of tungsten plus 1.9 times the amount of molybdenum in weight percent is greater than or equal to 14.75% and less than or equal to 18.15%; and wherein the combination of vanadium plus niobium (columbium) in weight percent is greater than or equal to 2.39% and less than or equal to 3.90%; with the remainder essentially iron and residual elements.

4. A high speed steel article, wherein the steel comprises the composition of claim 1.

5. A high speed steel article, wherein the steel comprises the composition of claim 2.

6. A high speed steel article, wherein the steel comprises the composition of claim 3.

7. The high speed steel composition of claim 1, wherein the composition is produced by powder metallurgy.

8. The high speed steel composition of claim 2, wherein the composition is produced by powder metallurgy.

9. The high speed steel composition of claim 3, wherein the composition is produced by powder metallurgy.

10. The high speed steel article of claim 4, wherein the article is suitable for production by additive manufacturing.

11. The high speed steel article of claim 5, wherein the article is suitable for production by additive manufacturing.

12. The high speed steel article of claim 6, wherein the article is suitable for production by additive manufacturing.

13. The high speed steel article of claim 4, wherein the article is a bi-metal blade.

14. The high speed steel article of claim 5, wherein the article is a bi-metal blade.

15. The high speed steel article of claim 6, wherein the article is a bi-metal blade.

16. A process for additive manufacturing, the process comprising the step of layering a powder of the high speed steel of claim 1.

17. A process for additive manufacturing, the process comprising the step of layering a powder of the high speed steel of claim 2.

18. A process for additive manufacturing, the process comprising the step of layering a powder of the high speed steel of claim 3.

19. The high speed steel composition of claim 1, wherein sulfur is replaced in all or in part with one or more elements selected from the group consisting of selenium, lead, and tellurium.

* * * * *